Feb. 17, 1970           G. M. CRAIG           3,496,023
HIGH POWER DENSITY ELECTROCHEMICAL METHOD AND
CELL FOR PRODUCING ELECTRICAL ENERGY
Filed Nov. 22, 1967
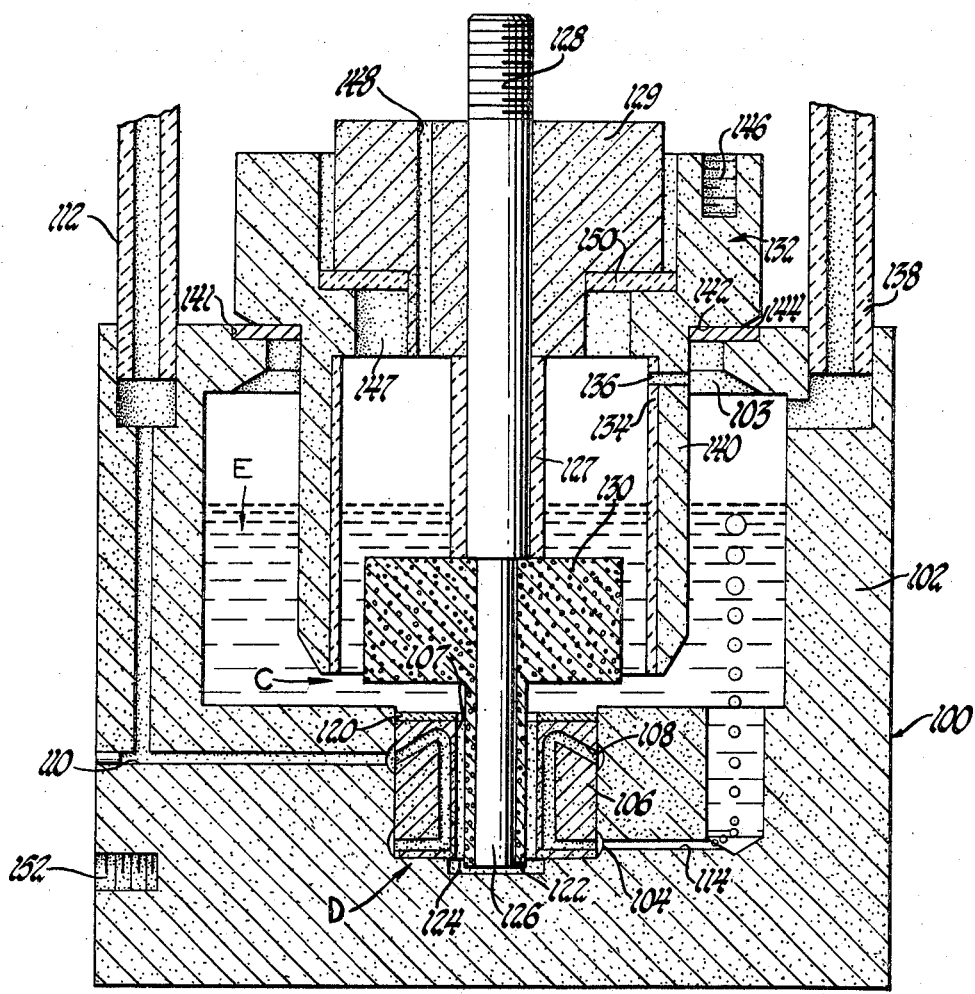
INVENTOR.
BY Gale M. Craig
R. J. Wallace
ATTORNEY

United States Patent Office 3,496,023
Patented Feb. 17, 1970

3,496,023
HIGH POWER DENSITY ELECTROCHEMICAL METHOD AND CELL FOR PRODUCING ELECTRICAL ENERGY
Gale M. Craig, Anderson, Ind., assignor to General Motors Corporation, Detroit, Mich., a corporation of Delaware
Filed Nov. 22, 1967, Ser. No. 684,996
Int. Cl. H01m 27/00, 27/22, 29/00
U.S. Cl. 136—86               13 Claims

ABSTRACT OF THE DISCLOSURE

A high power density galvanic cell and an integral electrolytic cell for the regeneration of the discharge reaction product. A dual-purpose, liquid reactant electrode which on charge generates and stores liquid reactant in one portion thereof and on discharge capillarily transports the liquid reactant to another portion for electrochemical consumption thereat. Separate charge and discharge counterreactant electrodes which oppose the respective portions of the liquid reactant electrode are provided. Narrow electrode spacing in the discharge cell and greater electrode spacing in the charge cell permit high discharge power densities and acceptable charging rates. A $Li/LiCl/Cl_2$ system illustrates the invention.

---

The invention herein described was made in the course of work under a contract with the Department of the Air Force.

This invention relates generally to secondary cells and more specifically to cells wherein at least one of the cell's reactants is a liquid, the other a gas, and the electrolyte is the electrolytically dissociable discharge reaction product of the two.

There are many applications for batteries which require relatively high power densities. By power density is meant the amount of available power per unit area of electrode surface, i.e., watts/cm.$^2$. To obtain high power densities it is necessary to minimize losses in the cell. One of the loss contributing factors in any electrochemical system is the IR drop across the electrolyte. One way of minimizing the electrolyte IR drop is by providing an extremely short electrolyte path or narrow electrode gap. A problem associated with the use of narrow electrode gaps, at least in some secondary systems, is that they impair or prohibit recharging of the cell. In a system wherein one reactant is a liquid, the other a gas and the electrolyte the dissociable product of the two reactants, too narrow an electrode gap prohibits the in situ electrolytic recharge of the cell. Regeneration of reactants must therefore be done externally of the cell. When one of the otherwise recoverable reactants is a gas, e.g., $Cl_2$ in the $Li/LiCl/Cl_2$ system, and the cell is charged using the discharge electrodes through the narrow gap, the chlorine forms on the working surface of the $Cl_2$ electrode. Some of the $Cl_2$ bubbles initially formed percolate up through the gap. This percolation of chlorine prevents electrolyte from entering the gap and restricts the supply of electrolyte to the electrodes. Eventually, gas voids are formed between the respective electrodes and further electrolysis ceases. In fact, the gas bridge between electrodes causes the direct chemical combination of lithium and chlorine as well as a highly corrosive attack on the lithium electrode itself. Hence, it has heretofore been impractical, if not impossible, to produce a secondary cell which had the desirable narrow electrode spacing so desirable for high power density discharge purposes while at the same time adequate electrode spacing for charging purposes. For many applications, especially military, it is desirable to have high power density cells which also have a sufficient energy storage capacity to be able to sustain high current drains for a reasonable length of time. Additionally, it is desirable to have high power density cells which can be activated or charged in a relatively short time. It is also desirable to have batteries of the type described which have long shelf lives.

It is, therefore, an object of this invention to provide a high power density secondary cell having an acceptably high charge rate, energy storage capacity and shelf life.

It is a further object of this invention to provide a high power density secondary cell having a minimum discharge electrode gap, a charging electrode gap sufficient to support a rapid charge rate, and a liquid reactant storage region within the cell itself.

A further object of this invention is to provide a liquid reactant electrode and cell for use therewith which electrode has charge, storage and discharge portions which respective charge and discharge portions are opposed by, and operated in conjunction with, separate gas electrodes during the respective charging and discharging cycles of the cell.

These and other objects and benefits of this invention will be brought forth more clearly by the detailed discussion which follows.

Briefly stated, this invention is a secondary cell comprising a high power density discharge portion and an integral electrolytic charging portion. The respective portions share a common liquid reactant electrode which in turn has different functional portions and which is immersed in a pool of electrolyte. The liquid reactant electrode consists essentially of charge, storage, and discharge portions, which portions are capillarily interconnected to permit flow of liquid reactant by capillary action from the storage portion to the discharge portion during cell discharge. Preferably the storage portion and the charge portion are one and the same and will be considered as such throughout the rest of this specification. The liquid reactant electrode is immersed in an electrolyte pool and the respective charge and discharge portions are therein opposed by two separate gas counterelectrodes. The counterelectrodes are appropriately spaced from the respective charge and discharge portions of the liquid reactant electrode. The electrode gap in the discharge portion of the cell is made extremely small to shorten the electrolyte path and thereby minimize the IR drop across the electrolyte. This gap is no larger than is necessary to accommodate the outflow of reaction product from between the electrodes at the maximum cell discharge rate sought to be achieved. Such a gap is too small for electrolytic charge purposes were the cell's discharge electrodes to be used. Additional electrodes and a separate electrode gap are therefore provided in the charge portion of the cell. These latter electrodes and gap are preferably larger than the corresponding electrodes in the discharge portion of the cell. The larger gap insures an adequate supply of electrolyte to the charge portion electrodes and precludes gaseous bridging of the electrode gap. The larger electrodes effectively reduce the need for high charging current densities while still maintaining an acceptable charging rate.

The drawing shows a sectioned view of a particular cell employing the feature of the invention.

While the following discussion will be in terms of a particular cell design adapted for use in conjunction with the high temperature $Li/LiCl/Cl_2$ battery system, it is not intended that the invention be limited thereto.

The drawing depicts a unitized cell assembly 100 which consists of a galvanic discharge portion D and an electrolytic charge portion C. The enclosure 102 houses the respective discharge and charge portions of the cell and is comprised of dense graphite. An opening 103, in the top of enclosure 102, is provided for the insertion of the charging chlorine electrode assembly 132, which is also comprised of dense graphite. The charging chlorine electrode assembly 132 has a depending cylindrical skirt 140 which extends through the opening 103 into the LiCl electrolyte pool E. The inner annulus of the electrode skirt 140 has a ceramic coating 134 applied thereto. This coating 134 is preferably a flame sprayed layer of $Al_2O_3$, though other ceramics such as BeA or the like may also be used. The coating 134 electrically insulates the inner annulus of the skirt 140 from the electrolyte E. Hence, when applying current to the chlorine electrode 132 during the charge cycle of the cell, chlorine is generated only on the outside surfaces of the skirt 140. The depending skirt 140 additionally isolates the space within the confines of the skirt from the $Cl_2$ gas generated on the outside of the skirt during the charge cycle. This reduces the possibility of corrosive attack of the lithium electrode located therein. The charging chlorine electrode assembly 132 is sealed to, but electrically insulated from, the enclosure 102 by means of a ceramic insulator ring 144. It is preferred to use a ring comprised of BeO. The ring 144 fits within the annular groove 141 formed in the upper surface of the enclosure 102. The charging chlorine electrode assembly 132 extends through the center of the ceramic ring 144 and tightly engages same at the shoulder 142. A terminal 146 is provided in the chlorine electrode 132 for the attachment of external leads thereto.

An opening 147 is provided through the center of the charging chlorine electrode 132. A dense graphite plug 129 is sealed into the opening 147 but is electrically insulated therefrom by means of ceramic ring 150. A gas port 148 is formed in the plug 129. The gas port 148 permits the injection of inert gases into the cell during warm up and charging, as will be discussed hereafter in connection with the operation of the cell. A molybdenum rod 126 is embedded in the graphite plug 129 and extends out from either end thereof. That portion of the molybdenum rod 126 which extends into the enclosure 102 supports the lithium electrode including its charge and storage portion 130 and discharge portion 122. The molybdenum rod 126 also serves as the electrical connection between the lithium electrode and the negative terminal 128. A ceramic, preferably BeO, sheath 127 circumscribes and protects the molybdenum rod through those portions of its length which might otherwise be exposed to the highly corrosive environment of the system.

The lithium electrode has a discharge portion 122, and a storage and charge portion 130. The portions of the lithium electrode are capillarily interconnected and are preferably comprised of highly porous electrically conductive substances which have a high wetting affinity for molten lithium and a much lesser wetting affinity for molten lithium chloride. Typically within this class of materials are metallic sponges, metallic wools and compressed and sintered fibermetal mats. In this latter category, materials known as Feltmetal, which is made and sold under that name by Huyck Metals Company are effective. The composition of the metal must be compatible with the particular environment in which it is used. Hence, in the corrosive Li-$Cl_2$ system it is generally preferred to use stainless steel. In the particular embodiment disclosed and tested wound layers of 70 x 80 mesh 304 stainless steel were used to form the respective portions of the electrode. By capillarily interconnected is meant that the structure is replete with interconnecting pores or passages which effect liquid flow into and through the electrode by capillary action.

The charge and storage portion 130 of the lithium electrode is a large porous metal matrix which has the aforesaid wetting affinity for lithium and hence preferentially draws any lithium which is formed on its outer surface into its interstices by capillary action. The cell is charged until the matrix is full of lithium. While it is not absolutely necessary, it is preferred to have a pore size gradient extending radially outward of the matrix such that smaller pores are adjacent the hub, or molybdenum rod 126, of the matrix. A pore size gradient enhances the ability of the matrix to capillarily draw the lithium towards its center. However, even absent a pore size gradient, there is a natural tendency for the lithium to seek the center of the matrix according to the laws governing surface tension affects which require that the smallest surface area possible be formed. At the hub of, and extending axially away from, the matrix and into the discharge cell portion D is the discharge portion 122 of the lithium electrode. The discharge portion 122 of the lithium electrode is preferably comprised of the same material as is the charge and storage portion 130. The discharge portion 122 is completely wet by the lithium and continues to remain so during discharge of the cell owing to the wicking action. Though not necessary, the charge portion may also use pore size gradients to improve the flow therethrough. The use of wicks as liquid reactant supply and support means in electrochemical cells is disclosed and claimed in copending U.S. patent application Ser. No. 590,038, entitled "Galvanic Cell System," which was filed on Oct. 27, 1966 in the names of T. G. Bradley et al. and assigned to the assignee of the instant invention. With respect to this aspect of, and as it may relate to, the instant invention, it is intended that the referenced Ser. No. 590,038 be included by reference in this specification.

The output of the cell is dependent on the discharge portion D thereof with its lithium electrode 122, corresponding discharge chlorine electrode 106, and narrow electrode gap 124. The discharge portion D of the cell is fitted into a well 104 formed in the enclosure 102. The discharge chlorine electrode 106 circumscribes the lithium electrode 122 and is comprised of a porous graphite material which has a plurality of $Cl_2$ passages 108 therethrough. The electrolyte space between these electrodes is made as close as possible to minimize the IR drop through the electrolyte. Gaps of less than one (1) millimeter are preferred where possible. However, sufficient clearance must always be allowed for the thermal expansion of the materials once the cell is heated. The $Cl_2$ flows behind the electrode's active surface 107. By active surface of the electrode is meant that surface of the $Cl_2$ electrode at which the $Cl_2$ is consumed in the electrochemical discharge reaction. Similarly on charge the active surface is that surface where the $Cl_2$ is principally generated. During cell discharge, the $Cl_2$ passages 108 are supplied with $Cl_2$ from the $Cl_2$ inlet passage 110 which is in turn supplied by the chlorine inlet tube 112. After passing behind the active surface 107 of the discharge $Cl_2$ electrode 106, the $Cl_2$ gas exits through the $Cl_2$ outlet passage 114 and bubbles upwardly through the electrolyte E and ultimately out of the cell assembly via the exit tube 138. The $Cl_2$ inlet tube 112 and outlet tube 138 are preferably comprised of ceramic. It is preferred to pass some excess $Cl_2$ gas through the $Cl_2$ electrode 106 rather than dead-ending the flow thereat. This is so because it sweeps any impurities in the gas through the electrode and prevents their build-up within the pores of the electrode to the eventual detriment of the electrode. Additionally, the excess flow of $Cl_2$ flushes out any lithium chloride which might leak into the $Cl_2$ supply system and possibly freeze therein cutting off the $Cl_2$ supply or otherwise causing damage thereto. The excess $Cl_2$, including any lithium chloride which might be picked up, passes through the electrolyte E before exiting from the cell. This effectively returns any entrained lithium chloride to the electrolyte pool. Passing the $Cl_2$ through electrolyte also provides a means for balancing or controlling the pressure differential across the active surface 107 of the discharge chlorine electrode 106. The cell is generally pressurized with an inert gas during its operation. By allowing the inert gas and the $Cl_2$ to commingle in the cell as shown, the pressure drop across the surface 107 is limited usually to the equivalent of the head of electrolyte in the cell. Such a pressure drop is ideal as it does not permit flooding of the electrode with LiCl or bubbling of the $Cl_2$ through the surface of the electrode. Likewise, it is more or less self-adjusting should there be any fluctuations in the pressures on either side of the surface 107.

Atop the discharge chlorine electrode 106 is placed a ceramic cap or disc 120. The cap 120 may simply be a ceramic washer or even a coating over this portion of the chlorine electrode. The cap 120 better defines the chlorine electrode's active surface and effectively limits it to the intended electrochemically active surface 107 which directly faces the lithium electrode 122. This reduces any stray currents while at the same time reduces lithium chloride leakage into the chlorine supply system through or by the electrode 106.

The injection port 148 is provided in the plug 129 so that, during the operation of the cell, a pressurized inert gas, such as Argon, may be supplied principally to the region above the lithium electrode. An exit port 136 is provided through the skirt 140. The Argon gas purges the region above the lithium electrode of any $Cl_2$ gas which might possibly leak into that region. Even under the worst of conditions, the Argon gas at least dilutes any $Cl_2$ gas in this region and effectively inhibits its corrosive attack of the materials contained therein and its direct chemical attack of the lithium stored therein. The Argon functions similarly on the outside of the skirt 140.

The cell described above is rechargeable and as such is appropriately designated as a secondary cell. Clearly, however, in a given situation, it may be used as a primary cell, and when used as such has a desirably long shelf life. The long shelf life of this cell results from the fact there is no need to store any of the cell's reactants in the cell itself but rather only the electrolyte. To activate the cell, it is necessary only to apply a current to the charging portion of the cell. This is done by connecting the negative terminal 128 and the positive charge terminal 146 to an appropriate source of direct current. Under these conditions, the LiCl dissociates and the lithium, which is formed on the outer surface of the charge portion of the lithium electrode 130, is drawn by capillary action into the storage matrix as discussed heretofore. The chlorine gas is formed on the outermost surface of the skirt 140 and escapes from the cell through exit tube 138. After the charge is completed and the lithium matrix 130 saturated with lithium, discharge of the cell may begin. Discharge of the cell is effected by attaching appropriate leads to the discharge positive terminal 152 and the discharge negative terminal 128, and supplying chlorine gas to the discharge chlorine electrode 106. Lithium is continuously fed from the storage portion 130 to the discharge potrion 122 of the lithium electrode in accordance with the teachings of the aforesaid U.S. patent application Ser. No. 590,038.

In the particular cell disclosed, a discharge electrode gap of one (1) millimeter and a $Cl_2$ electrode area of 12.6 cm.$^2$ produced a cell which when operated at about 650° C. and one (1) atmosphere pressure had an open circuit voltage of 3.46 volts. The cell was then discharged under varying loads and in increasing steps. At one point, 88 amps were drawn at a voltage of 2.67 volts. At another point, 96 amps were drawn at 2.53 volts. These latter data indicates an approximate power density of about 18 w./cm.$^2$ after correction for stray currents. Other tests on similarly constructed cells produced comparable power densities. In one such test, the cell was pressurized to 3 atmospheres and charged to about 70 amp-hrs. input. On discharge, loading step changes were intially made for about 9 minutes before a constant discharge level of 120 amps at about 2.1 volts was set and held for about 13 minutes. The total discharge here was about 42 amp-hrs. which therefore yielded an overall coulombic efficiency of about 60%. Still another test was run in a similar cell wherein the discharge electrode gap was 0.6 mm., the $Cl_2$ electrode area 12.6 cm.$^2$, and the operating pressure one (1) atmosphere. This cell was recharged and discharged with a total discharge time of about 2.5 hours. In this cell, the self discharge rate, obtained from the open circuit $Cl_2$ consumption rate, was determined to be about 0.6 amp/cm.$^2$. A constant drain of 75 amps was placed on the cell and at a voltage of about 2.57 tests were made to determine the effects of excess $Cl_2$ flow rate on the system. During these determinations a power density of about 14.3 w./cm.$^2$ was observed. Still further tests on this same cell were made to determine the minimum $Cl^2$ flow rate required to support specific current drains. These data are briefly shown in the table below.

TABLE

| $Cl_2$ flow rate cm.$^3$/min.: | Cell current, amps |
| --- | --- |
| 80 | 10 |
| 145 | 20 |
| 310 | 40 |
| 440 | 60 |
| 575 | 80 |
| 625 | 90 |

While this invention has been disclosed primarily in terms of a specific embodiment thereof, it is not intended that the invention be limited thereto but rather only by the scope of the appended claims.

I claim:

1. A high power density, current producing electrochemical cell having a liquid reactant, a gaseous reactant and an electrolyte separating said reactants, which electrolyte consists essentially of the electrolytically dissociable reaction product of said liquid and gaseous reactants, said cell comprising a discharge portion and a charging portion, said discharge portion comprising an electrode for the electro-chemical consumption of said liquid reactant, and an opposing counterelectrode for the electrochemical consumption of said gaseous reactant, said electrodes being spaced apart by a first electrolyte-filled gap, said charging portion being an integral part of said cell and comprising an electrode for the electrolytic generation of said liquid reactant from said electrolyte and a counterelectrode for the electrolytic generation of said gaseous reactant from said electrolyte, said charging cell's electrodes being spaced apart by a second electrolyte-filled gap, said electrode for the electrochemical consumption of said liquid reactant and said electrode for the electrochemical generation of said liquid reactant being interconnected such that liquid reactant which is formed in the charge portion of the cell will flow to the discharge portion of the cell during cell discharge, said interconnected electrodes being immersed in said electrolyte in such relation to their respective counterelectrodes as to provide said first and second electrode gaps, said first gap being of such small dimension as to preclude a cell charge yet support a low IR drop cell discharge through said first gap.

2. A high power density, current producing electrochemical cell having a liquid reactant, a gaseous reactant and an electrolyte separating said reactants, which electrolyte consists essentially of the electrolytically dissociable reaction product of said liquid and gaseous reactants, said cell comprising a discharge portion and a charging portion, said discharge portion comprising an electrode for the electrochemical consumption of said liquid reactant, and an opposing counterelectrode for the electrochemical consumption of said gaseous reactant, said electrodes being spaced apart by a first electrolyte-filled gap, said charging portion being an integral part of said cell and comprising an electrode for the electrolytic generation and in situ storage of said liquid reactant from said electrolyte and a counterelectrode for the electrolytic generation of said gaseous reactant from said electrolyte, said charging cell's electrodes being spaced apart by a second electrolyte-filled gap, said electrode for the electrochemical consumption of said liquid reactant and said electrode for the electrochemical generation of said liquid reactant being interconnected such that liquid reactant which is formed in the charge portion of the cell will flow to the discharge portion of the cell during cell discharge, said interconnected electrodes being immersed in said electrolyte in such relation to their respective counterelectrodes as to provide said first and second electrode gaps, said first gap being of such small dimension as to preclude a cell charge yet support a low IR drop cell discharge through said first gap.

3. A high power density, current producing electrochemical cell having a liquid reactant, a gaseous reactant and an electrolyte separating said reactants, which electrolyte consists essentially of the electrolytically dissociable reaction product of said liquid and gaseous reactants, said cell comprising a discharge portion and a charging portion, said discharge portion comprising an electrode for the electrochemical consumption of said liquid reactant, and an opposing counterelectrode for the electrochemical consumption of said gaseous reactant, said electrodes being spaced apart by a first electrolyte-filled gap, said charging portion being an integral part of said cell and comprising an electrode for the electrolytic generation of said liquid reactant from said electrolyte and a counterelectrode for the electrolytic generation of said gaseous reactant from said electrolyte, said charging cell's electrodes being spaced apart by a second electrolyte-filled gap, said electrode for the electrochemical consumption of said liquid reactant and said electrode for the electrochemical generation of said liquid reactant being capillarily interconnected such that liquid reactant which is formed in the charge portion of the cell will flow to the discharge portion of the cell during cell discharge, said interconnected electrodes being immersed in said electrolyte in such relation to their respective counterelectrodes as to provide said first and second electrode gaps, said first gap being of such small dimension as to preclude a cell charge yet support a low IR drop cell discharge through said first gap.

4. A high power density, current producing electrochemical cell having a liquid reactant, a gaseous reactant and an electrolyte separating said reactants, which electrolyte consists essentially of the electrolytically dissociable reaction product of said liquid and gaseous reactants, said cell comprising a discharge portion and a charging portion, said discharge portion comprising an electrode for the electrochemical consumption of said liquid reactant, and an opposing counterelectrode for the electrochemical consumption of said gaseous reactant, said electrodes being spaced apart by a first electrolyte-filled gap, said charging portion being an integral part of said cell and comprising an electrode for the electrolytic generation and in situ storage of said liquid reactant from said electrolyte and a counterelectrode for the electrolytic generation of said gaseous reactant from said electrolyte, said charging cell's electrodes being spaced apart by a second electrolyte-filled gap, said electrode for the electrochemical consumption of said liquid reactant and said electrode for the electrochemical generation of said liquid reactant being capillarily interconnected such that liquid reactant which is formed in the charge portion of the cell will flow to the discharge portion of the cell during discharge, said interconnected electrodes being immersed in said electrolyte in such relation to their respective counterelectrodes as to provide said first and second electrode gaps, said first gap being of such small dimension as to preclude a cell charge yet support a low IR drop cell discharge through said first gap.

5. The electrochemical cell as defined in claim 4 wherein said liquid reactant is a molten metal, said gaseous reactant is a halogen and said electrolyte is the metal halide corresponding to the reaction product of said metal and said halogen.

6. A high power density galvanic cell and integral electrolytic charging unit therefor said galvanic cell having a liquid reactant, a gaseous reactant and an electrolyte separating said reactants, which electrolyte consists essentially of the electrolytically dissociable reaction product of said liquid and gaseous reactants, said galvanic cell comprising an electrode for the electrochemical consumption of said liquid reactant, an opposing counterelectrode for the electrochemical consumption of said gaseous reactant and a narrow electrolyte-filled gap between said electrodes, said narrow electrolyte gap being of such small dimension as to preclude the charging of said cell therethrough though suitable to support a low IR drop discharge of said cell therethrough, said electrolytic charging unit comprising an electrode for the generation of said liquid reactant from said electrolyte, a counterelectrode for the generation of said gaseous reactant from said electrolyte and an electrolyte-filled gap between said electrodes, wherein said electrode for the electrochemical consumption of said liquid reactant and electrode for the generation of said liquid reactant are distinct portions of one and the same electrode and wherein the portions are capillarily interconnected such that liquid reactant which is formed in the charging unit will flow to the galvanic cell during cell discharge, said portions of said liquid reactant electrode and their respective counterelectrodes being immersed in a common pool of said electrolyte.

7. The galvanic cell as defined in claim 6 wherein said liquid reactant is a molten metal, said gaseous reactant is a halogen and said electrolyte is the metal halide corresponding to the reaction product of said metal and said halogen.

8. A high power density, secondary electrochemical cell having a liquid reactant, a gaseous reactant and an electrolyte separating said reactants, which electrolyte is the electrolytically dissociable reaction product of said liquid and gaseus reactants, said cell comprising a liquid reactant electrode and at least two gaseous reactant electrodes, one of said gaseous reactant electrodes being for cell discharge purposes and the other of said gaseous reactant electrodes being for cell charging purposes, said electrodes for said respective liquid and gaseous reactants being immersed in a common pool of said electrolyte, said liquid reactant electrode having two portions, a discharge portion and a charge portion, said discharge portion being opposed by, and in spaced relation to, said one of said gaseous reactant electrodes so as to provide a first electrolyte-filled gap therebetween, said charge portion being opposed by, and in a spaced relation to, said other of said gaseous reactant electrodes so as to provide a second electrolyte-filled gap therebetween, said first gap being of such small dimension as to preclude charging said cell therethrough yet suitable to support a low IR drop discharge of said cell therethrough, said second gap being of such dimension as to permit the charging of said cell therethrough but not suitable for a low IR drop discharge therethrough, said discharge and charge portions of said liquid reactant electrode being capillarily interconnected such that liquid reactant which is formed in the charging portion of the electrode will flow by capillary action to the discharge portion of the electrode as required.

9. The secondary cell as defined in claim 8 wherein said liquid reactant is a molten metal, said gaseous reactant is a halogen and said electrolyte is the metal halide corresponding to the reaction product of said metal and said halogen.

10. A process for electrochemically producing a current from a liquid reactant, a geaseous reactant and an electrolyte which is the electrolytically dissociable reaction product of said liquid and gaseous reactants comprising the steps of providing a pool of said electrolyte, providing a discharge electrode for said liquid reactant in said electrolyte, providing a charging electrode for said liquid reactant in said electroylte, providing discharge and charging counterelectrodes for said gaseous reactants in said electrolyte opposite to said respective liquid reactant electrodes, closely spacing said liquid reactant discharge electrode with respect to said gaseous reactant discharge electrode to form a first narrow gap therebetween of such small dimension that it is suitable for a low IR drop discharge across said gap but not for sustaining a charge thereacross, appropriately spacing said liquid reactant charging electrode with respect to said gaseous reactant charging electrode to form a second gap therebetween of such a dimension as to be sufficent to sustain a charge across said gap but not suitable for sustaining a low IR drop discharge thereacross, capillarily interconnecting said liquid reactant electrodes, electrolytically dissociating said electrolyte into said liquid and gaseous reactants, recovering at least said liquid reactant at said liquid reactant charging electrode, subsequently flowing said recovered liquid reactant by capillary action from said charging electrode to said liquid reactant discharge electrode while flowing said gaseous reactant to said gaseous reactant discharge electrode, and electrically connecting said liquid and gaseous reactant discharge electrodes through a load to effect a low IR drop discharge across said narrow gap.

11. The process as defined in claim 10 wherein said liquid reactant is a molten metal, said gaseous reactant is a halogen and said electrolyte is the metal halide formed by the reaction of said metal and said halogen.

12. The process as defined in claim 11 wherein excess quantities of said halogen are caused to flow through said halogen discharge electrode.

13. The process as defined in claim 12 wherein said excess halogen is caused to flow through said electrolyte after emerging from said halogen discharge electrode to provide a pressure differential control across said halogen discharge electrode.

References Cited

UNITED STATES PATENTS

| | | | |
|---|---|---|---|
| 2,207,734 | 7/1940 | Heise et al. | 136—136 |
| 2,907,809 | 10/1959 | Southworth et al. | 136—136 X |
| 3,134,698 | 5/1964 | Neipert et al. | 136—136 |
| 3,350,233 | 10/1967 | Plust et al. | 136—86 |

ALLEN B. CURTIS, Primary Examiner

U.S. Cl. X.R.

136—136